May 15, 1956  L. E. GARTNER  2,746,004
GENERATOR POLARIZING SYSTEM
Filed June 3, 1952

INVENTOR.
LAWRENCE E. GARTNER
BY James M. Nickels
ATTORNEY

United States Patent Office 2,746,004  
Patented May 15, 1956

2,746,004
GENERATOR POLARIZING SYSTEM

Lawrence E. Gartner, Lodi, N. J., assignor to Bendix Aviation Corporation, Eatontown, N. J., a corporation of Delaware Application June 3, 1952, Serial No. 291,420

6 Claims. (Cl. 322—6)

The present invention relates to dynamoelectric machines and more particularly to polarizing means for a dynamoelectric machine.

Difficulty has been encountered in aircraft generating systems in insuring the build-up of direct current generators in the proper polarity. The requirements of the system necessitate the opening and closing of the field circuit at very high speeds. Under such a condition, severe regulator overshoot and transients can easily cause a reversal of current in the shunt field and hence reverse the residual magnetism. Also, generators which have been tripped off the line due to overvoltage or a short circuit fault are susceptible to loss or reversal of residual magnetism. In the event of the occurrence of a loss or reversal of residual magnetism, the generator cannot be connected to the system bus and its capacity is lost to the system until such time as the proper residual magnetism is restored. Heretofore, it has been necessary by a manual operation to flash the field in the correct polarity by means of a battery. Such an operation is feasible only when the aircraft is on the ground where the facilities to perform the operation are available. Another object is that, while in flight, the personnel might not have any indication that the generator had a reversal of polarity and would attempt to put it on the system which might upset the entire system and cause excessive damage.

The present invention provides means for automatically flashing the field with the correct polarity upon closure of the field relay.

It is an object of the invention to provide novel means for flashing a generator with a current of the desired polarity.

Another object of the invention is to provide novel polarizing means for a dynamoelectric machine.

Another object of the invention is to provide improved and novel generator field energizing and polarizing means.

Another object of the invention is to provide novel means for automatically polarizing a generator upon energization of the generator field.

The above and other objects and features of the invention will appear more fully hereinafter from a consideration of the following description taken in connection with the accompanying drawing wherein two embodiments are illustrated by way of example.

Figure 1:
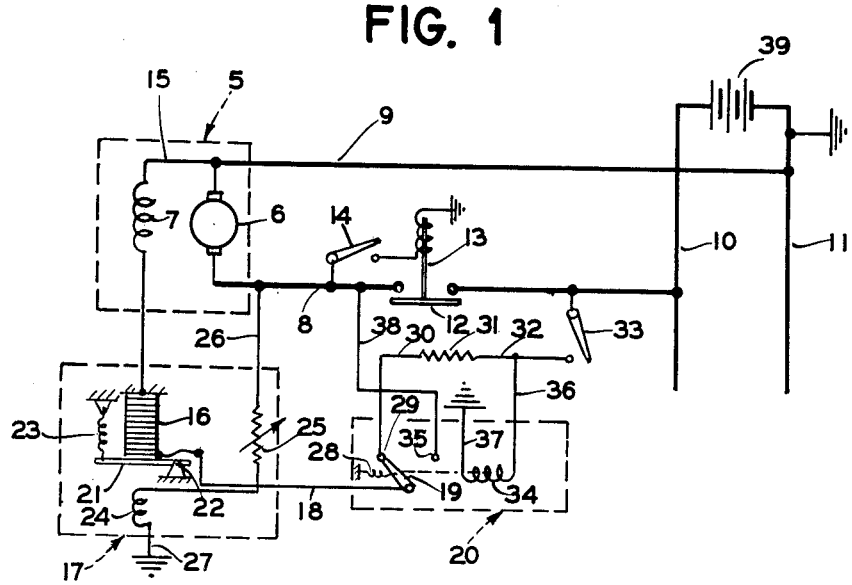
Figure 1 is a schematic diagram of a direct current generator embodying the invention.

Referring now to Figure 1, a generator is indicated generally by the numeral 5 and has an armature 6 and a field winding 7. Output conductors 8 and 9 are connected to the respective output terminals of the armature 6 and connect to the main buses 10 and 11. A switch member 12 may be inserted in the conductor 8 to control the connection of the generator 5 to the bus 10.

The switch 12 is illustrated as being controlled by a winding 13. One end of the winding 13 is connected to ground, the other end of the winding is connected to the conductor 8 by a manual switch 14. It is understood, however that other switch means may be used to connect the generator 5 to the bus 10.

One end of the field winding 7 is connected to one output terminal of the generator 5 by a conductor 15. The other end of the winding 7 is connected to one end of a carbon pile resistance element 16 of a regulator 17. The other end of the carbon pile element 16 is connected by conductor 18 to switch member 19 of field relay 20.

The regulator 17 is illustrated diagrammatically as including an armature 21 pivoted at 22 and biased under tension of a spring 23 in a direction tending to decrease the resistance of the carbon pile 16. An electromagetic winding 24 biases the armature 21 in a direction opposing the spring 23 and tending to increase the resistance of the carbon pile 16. One end of the winding 24 is connected by resistor 25 and conductor 26 to the output line 8. The other end of the winding 24 is connected by a conductor 27 to ground.

A novel feature of the invention is the arrangement of the field relay 20. The switch member 19 of the relay 20 is biased by a spring 28 into engagement with a contact 29. The contact 29 is connected by conductor 30, resistor 31, conductor 32 and switch 33 to the bus 10. A control winding 34 is adapted, when energized, to actuate the switch member 19 into engagement with contact 35. One end of the winding 34 is connected by conductor 36 to the conductor 32 while the other end of the winding 34 is connected by a conductor 37 to ground. The contact 35 is connected by a conductor 38 to the output line 8.

The main buses 10 and 11 have a battery 39 connected thereto and have a fixed polarity.

In operation, upon closure of the switch 33, the field winding is flashed with correct polarity from the bus 10 and battery 39. At the same time, the winding 34 is energized and actuates the switch member 19 into engagement with the contact 35 and thereby energizes the field winding 7. The delay, which may be inherent or planned, in the relay 20 to actuate the switch member 19 against the bias of the spring 28 is sufficient for the flashing operation as only a momentary flash is sufficient. The resistor 31 limits the flashing current to a minimum required value and can be of such magnitude and rating to prevent burning out the field winding 7 should the relay 20 fail to operate. Thus, the residual magnetism of the generator is corrected upon each closure of the field relay energizing switch 33 and the proper polarity build-up is assured. Also, a new generator whose residual magnetism is unknown or lost will automatically be polarized in the right direction.

While only a minimum of control equipment has been illustrated and described, it is understood that other control equipment may be used, it being omitted for simplicity.

Figure 2:
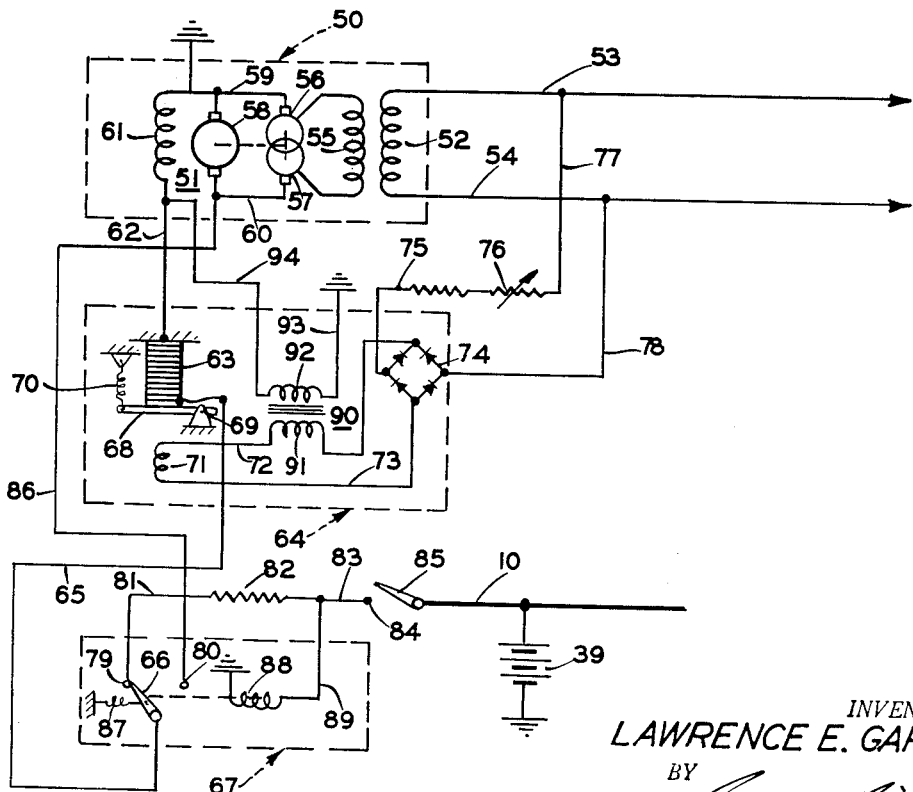
Figure 2 is a schematic diagram of an alternating current generator with a direct coupled exciter embodying the invention.

Referring now to Figure 2, in which an alternating current generator 50 is illustrated as having a direct coupled exciter 51. The generator 50 has an output winding 52 connected to output lines 53 and 54. An excitation winding 55 is connected across slip rings 56, 57 and is coupled for rotation with armature 58 of the exciter 51. The slip rings 56 and 57 are connected to the output of the exciter 51 by conductors 59 and 60. The exciter 51 has a field winding 61, one end of which is connected to one output terminal of the exciter 51. The other end of the winding 61 is connected by a conductor 62 to one end of a carbon pile resistance element 63 of a regulator indicated generally by the numeral 64. The other end of the carbon pile element 63 is connected by a conductor 65 to a switch member 66 of field relay 67.

The regulator 64 is illustrated diagrammatically as including an armature 68 pivoted at 69 and biased under tension of a spring 70 in a direction tending to decrease the resistance of the carbon pile 63. An electromagnetic winding 71 biases the armature 68 in a direction opposing the spring 70 and tending to increase the resistance of the carbon pile 63.

The winding 71 is connected by conductors 72 and 73 across the output of a rectifier 74. One input terminal of the rectifier 74 is connected by conductor 75, resistor 76 and conductor 77 to the output line 53. The other input terminal of the rectifier 74 is connected by conductor 78 to the output line 54.

The field relay 62 has contacts 79 and 80 adapted to be engaged by the switch arm 66. The contact 79 is connected by conductor 81, resistor 82 and conductor 83 to a contact 84 of switch 85 which is connected to DC bus 10 and battery 39. The contact 80 is connected by conductor 86 to the other output terminal of the exciter 51.

The switch member 66 is normally biased into engagement with the contact 79 by a spring 87. A control winding 88, when energized, is adapted to actuate the switch member 66 to overcome the bias of the spring 87 and engage the contact 80. One end of the winding 88 is connected by a conductor 89 to the conductor 83 while the other end is connected to ground.

A stabilizing transformer 90 having windings 91 and 92 may be connected in the system. The winding 91 is inserted in the conductor 72. One end of the winding 92 is connected by a conductor 93 to ground while the other end is connected by a conductor 94 to the conductor 62.

The operation is somewhat similar to that of Figure 1 in that when the switch 85 is closed, the field winding 61 is momentarily flashed by a current of the desired polarity before the switch arm 66 is actuated to close the field circuit.

The generator with a direct coupled exciter is prone to inadvertent reversal on build-up at high speeds due to the fact that a minimum of excitation is required and severe regulator transients occur due to the inherent instability of the system. The build-up of such a system is also hindered, when not influenced by flashing upon energizing the field relay, due to the necessary existence of the rotating field connected at all times across the armature and, hence, the immediate flow of demagnetizing armature current on build-up.

Another advantage of the system is that it will insure the build-up of generators that have developed a high resistance brush film due to the accommulation of oil and dirt in the commutators, the use of impregnated high altitude brushes, or operation for periods of time with an open field circuit and no current flow in the brushes. Often the residual magnetism is too low to insure the proper build-up under the aforenoted conditions.

The novel means of automatically flashing a generator may be incorporated with other automatic protective devices to insure the proper build-up of generators which have been tripped off the line due to overvoltage or short circuit faults and thereby have become susceptible to loss of, or reversal of residual magnetism. Upon elimination of the fault, not necessarily in the generator, proper build-up and restoration of the generator into service without shutdown and manual flashing is accomplished.

Although only two embodiments of the invention have been illustrated and described, various changes in the form and relative arrangement of the parts, which will now appear to those skilled in the art, may be made without departing from the scope of the invention.

What is claimed is:

1. Apparatus for use in a generator system having a field winding, comprising switch means for energizing said field winding, electromagnetic means for actuating said switch means, a source of direct current for energizing said electromagnetic means, and means energized by the energization of said electromagnetic means connecting and source of direct current to said field winding said last means being disconnected from said field winding upon actuation of said switch means.

2. Apparatus for polarizing a generator having a field winding, comprising a field energizing switch, relay means for actuating said switch, a source of constant polarity direct current, means for energizing said relay means from said direct current source, and circuit means energized by said last means for impressing said direct current upon said field, said circuit means being deenergized upon actuation of said field energizing switch.

3. Apparatus for automatically polarizing a generator having a field winding, comprising a field relay normally biased in a first position, electromagnetic means for actuating said field relay, a source of direct current for energizing said electromagnetic means, switch means for controlling the connection of said source of direct current to said electromagnetic means, circuit means for connecting said switch means to the normally first position of said field relay whereby said direct current is impressed upon said field from said source upon said switch means being actuated to connect said electromagnetic means to said source, and actuation of said relay to a second position by said electromagnetic means disconnects the source of direct current from said field winding.

4. Apparatus for automatically polarizing the field winding of a generator having a field energizing relay, comprising a source of direct current for energizing said field relay, switch means for controlling the energization of said relay, a contact adapted for engagement by said relay when in a first position, means connecting said contact to said switch means whereby upon closure of said switch means said field winding is flashed from said direct current source before operation of said relay means to a second position.

5. Apparatus for flashing the field winding of a generator with a direct current of a desired polarity, comprising a field circuit, a field relay normally biased in a first position, a contact member adapted to be engaged by said relay when in said first position, a control winding for said relay, a source of direct current, switch means for connecting said control winding to said source of direct current, means including a limiting resistor for connecting said contact member to said switch means whereby said field is flashed by said direct current before operation of said relay to a second position.

6. The combination as set forth in claim 5 and including delay means for said relay.

References Cited in the file of this patent

FOREIGN PATENTS 593,627     Great Britain _ _ _ _ _ _ _ _ _ _ _ Oct. 22, 1947